Figure 1:
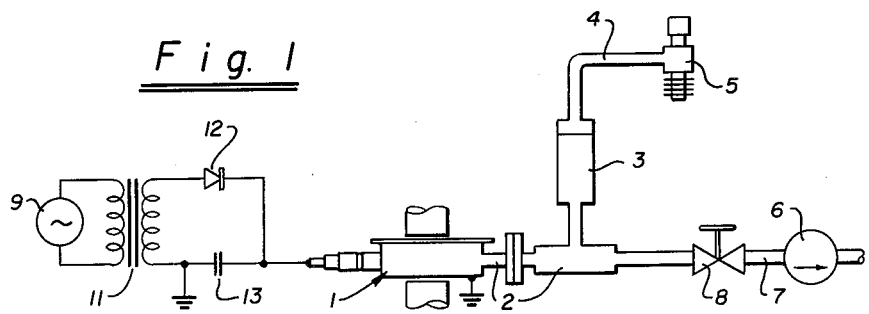

April 3, 1962 R. L. JEPSEN 3,028,071
GLOW DISCHARGE APPARATUS
Filed March 6, 1959 3 Sheets-Sheet 1

INVENTOR.
Robert L. Jepsen
BY
Attorney

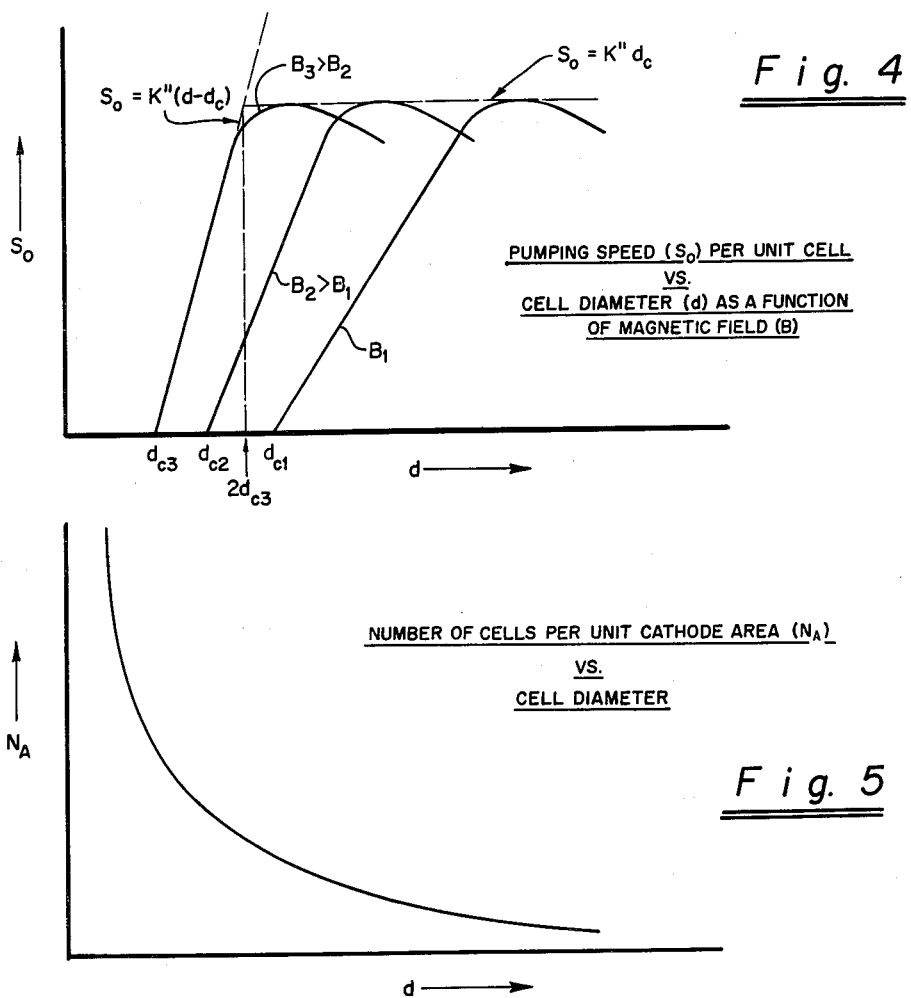
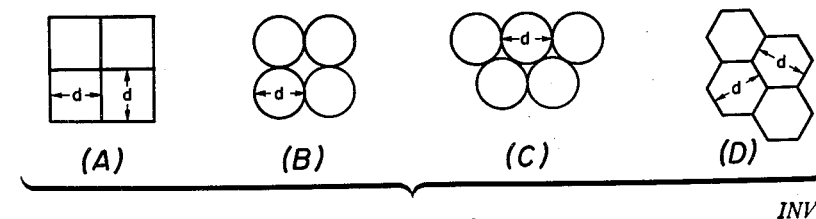
Fig. 6

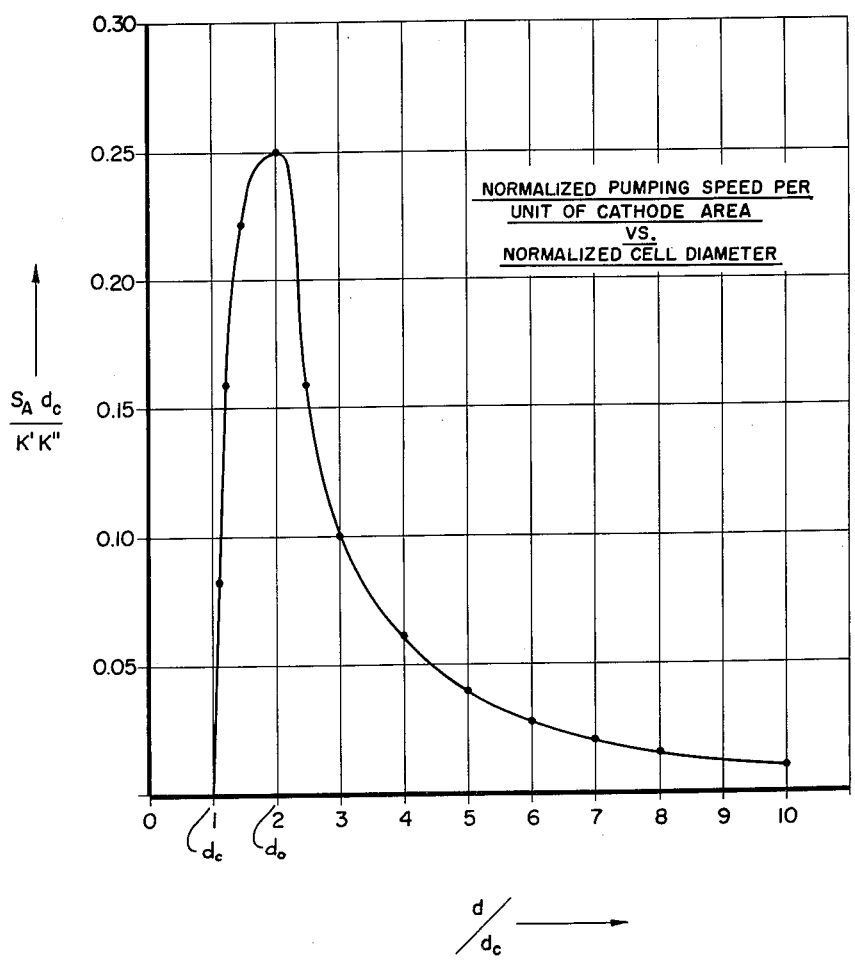

United States Patent Office 3,028,071
Patented Apr. 3, 1962

3,028,071
GLOW DISCHARGE APPARATUS
Robert L. Jepsen, Los Altos, Calif., assignor to Varian Associates, Palo Alto, Calif., a corporation of California
Filed Mar. 6, 1959, Ser. No. 797,673
30 Claims. (Cl. 230—69)

The present invention relates in general to glow discharge devices and more particularly to an improved anode for such devices having critical proportions whereby the ion current is greatly enhanced. This critically proportioned anode improves the operating performance of devices utilizing the glow discharge principle such as, for example, certain vacuum pumps and vacuum gages.

Heretofore vacuum pumps and vacuum gages have been built having for their principle of operation the establishment of a glow discharge within the interior of an open ended tubular anode disposed between and spaced apart from two cathode plates and having a magnetic field threaded through the anode. Positive ions produced by the glow discharge are directed against the cathode plates. In the pump, the impinging ions produce sputtering of a reactive cathode material. The sputtered material is collected upon the interior surfaces of the pump where it serves to entrap molecules in the gaseous state coming in contact therewith. In this manner, the gas pressure within a vessel enclosing the cathode and anode elements is reduced. In the vacuum gage, the impinging ions are collected by the cathode and the ion current measured to give a measure of the gas pressure within the device to which the gage is attached. Optimizing the ion current in such glow discharge devices increases the operating performance by increasing either the pumping speed of the pump or sensitivity of the vacuum gage.

According to the teachings of the present invention a certain critical minimum diameter $d_c$ for the individual tubular anode compartments has been discovered for each certain value of magnetic field intensity. Ion current for cells of diameter less than the critical diameter, for practical purposes, goes to zero. It is also found that the critical minimum diameter $d_c$ varies inversely with magnetic field intensity B. Furthermore, there has been discovered a certain optimum diameter $d_o$ for the individual tubular anode compartments, for each certain magnetic field intensity B. Cells of optimum diameter $d_o$ produce a maximum ion current. Moreover, the certain critical minimum diameter $d_c$ and optimum diameter $d_o$ are related to each other by a simple expression. Thus, according to the teachings of the present invention given either a certain magnetic field intensity B or a certain cell diameter $d$ the optimum cell diameter $d_o$ or magnetic field intensity B may be readily ascertained to obtain maximum ion current per unit area of cathode surface.

The principal object of the present invention is to provide a novel improved glow discharge device having certain critical anode proportions whereby that portion of the operating performance which is dependent on the magnitude of ion current may be optimized.

One feature of the present invention is the discovery of a certain minimum diameter dimension as a function of magnetic field intensity for the individual tubular anode compartments such that the diameter of the anode compartments may be selected in excess of this certain dimension to enhance performance of the anode.

Another feature of the present invention is the provision of a certain optimum diameter for the individual tubular anode compartments as a function of magnetic field intensity such that the ion current per unit area of cathode surface may be optimized.

Figure 2:
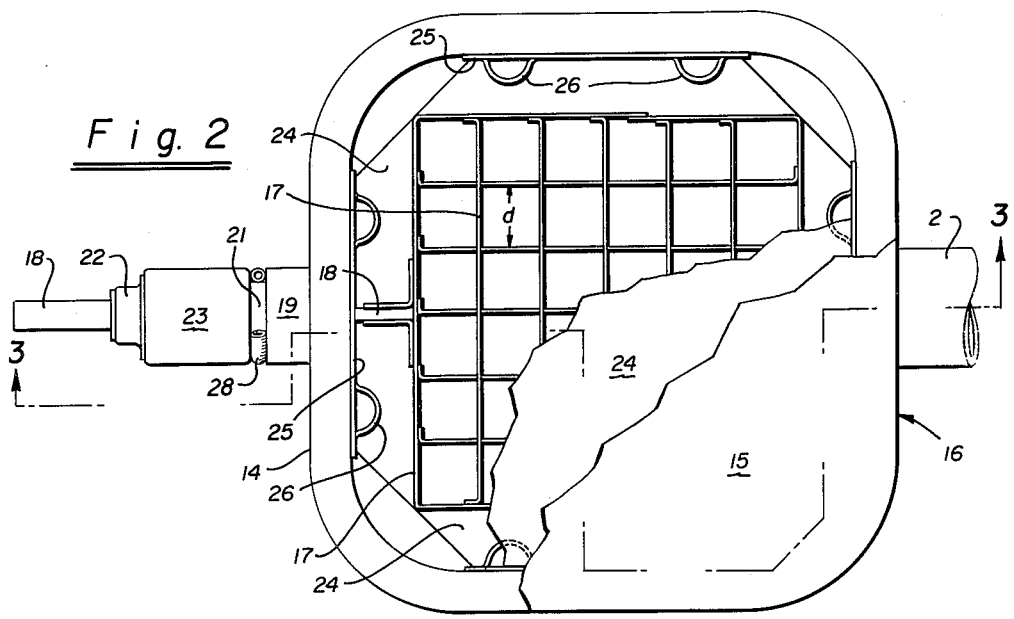
Figure 3:
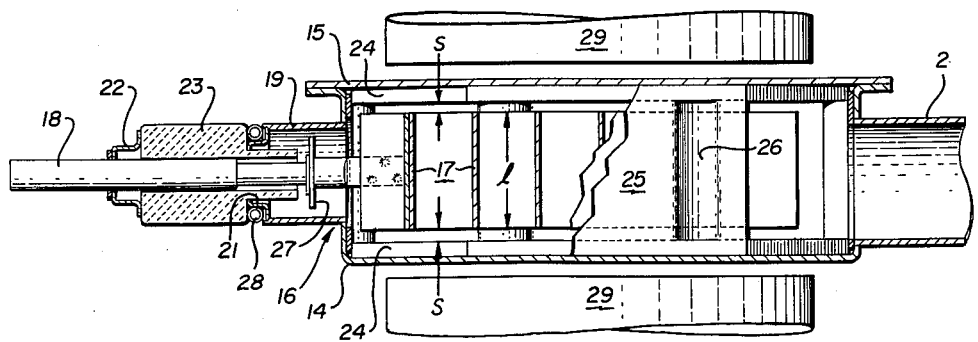

Other features and advantages of the present invention will become apparent upon a perusal of the specification taken in connection with the accompanying drawings wherein, FIG. 1 is a schematic block diagram depicting a typical evacuation system utilizing the novel vacuum pump of the present invention, FIG. 2 is a plan view partly in cross section of a novel electrical vacuum pump apparatus of the present invention, FIG. 3 is a cross sectional view of the structure of FIG. 2 taken along line 3—3 in the direction of the arrows, FIG. 4 is a graph of pumping speed per unit cell vs. cell diameter as a function of magnetic field intensity, FIG. 5 is a graph of the number of anode cells per unit of cathode area vs. cell diameter, FIG. 6A is a cross sectional view through a cellular anode having cells of rectangular cross section.

FIG. 6B is a cross sectional view through a cellular anode having cells of circular cross section, FIG. 6C is a cross sectional view through a cellular anode having cells of circular cross section and the cells being closely packed, FIG. 6D is a cross sectional view through a cellular anode having cells of hexagonal cross section, and FIG. 7 is a graph of normalized pumping speed per unit of cathode area vs. normalized cell diameter.

Referring now to FIG. 1 there is shown in schematic block diagram form the novel electrical vacuum pump of the present invention as utilized for evacuating a given structure. More specifically, an electrical vacuum pump 1 is connected via a hollow conduit 2 to a compression port 3 and thence via a hollow conduit 4 to the structure 5, which it is desired to evacuate. The compression port 3 serves to provide a valve mechanism whereby the structure 5 and associated conduit 4 may be removed and replaced by another structure and conduit for successive evacuation of a plurality of structures 5. A mechanical vane vacuum pump 6 is also connected to the compression port 3 via conduit 7 and pinch-off valve 8. To evacuate the structure 5, the mechanical vane pump 6 is put into operation serving to reduce the pressure within the structure 5 to between 5 and 20 or lower microns at which point the valve 8 is closed and the electrical vacuum pump 1 started.

Pump is supplied with operating potentials from a source 9 as, for example, a 60 cycle power line via transformer 11. The secondary of transformer 11 is provided with a rectifier 12 and shunting smoothing capacitor 13 whereby a D.C. potential may be applied between anode and cathode members of the electrical vacuum pump 1, which will be more fully described below. Although a preferred embodiment utilizes a D.C. potential, A.C. potentials are also operable.

Referring now to FIGS. 2 and 3 a shallow rectangular cup shaped member 14 as of, for example, stainless steel, is closed off at its flanged open end by a rectangular closure plate 15 welded about its periphery to the flanged portion of member 14 thereby forming a substantially rectangular vacuum tight envelope 16.

A rectangular cellular anode 17 as of, for example, titanium is carried upon the end of a conductive rod 18 as of, for example, stainless steel which extends outwardly of the rectangular vacuum envelope 16 through an aperture in a short side wall thereof. The conductive rod 18 is insulated from and carried by the vacuum envelope 16 through the intermediaries of annular insulator frames 19, 21 and 22 as of, for example, Kovar and cylindrical insulator 23 as of, for example, alumina ceramic. The free end of the rod 18 serves to provide a terminal for applying a positive anode voltage with respect to two substantially rectangular cathode plates 24.

The cathode plates 24 are made of a reactive metal and are mechanically locked in position against the large flat side walls of the vacuum envelope 16 via the intermediary of two cathode spacer plates 25. The cathode spacer plates 25, as of stainless steel, are provided with semi-cylindrical ears 26 struck therefrom for assuring proper spacing between the cathode plates 24. In a preferred embodiment, the anode to cathode spacings lies within the range of between 0.1″ and 0.5″. The cathode plates 24 may be made of any one of a number of reactive cathode metals such as, for example, titanium, chromium, zirconium, gadolinium, and iron. However, it is desirable to prevent flaking of the condensed sputtered layer of cathode material, to make the anode 17 and cathodes 24 of the same material.

Another side wall of the vacuum envelope 16 is apertured to receive the hollow conduit 2, which may be of any convenient inside diameter commensurate with the desired pumping speed. The hollow conduit 2 communicates with the structure 5 which it is desired to evacuate and is provided with a suitable mounting flange.

A circular radial shield 27 as of, for example, molybdenum is carried transversely of conductive rod 18 and is disposed inside the first frame member 19 for shielding the insulator 23 from sputtered cathode material which might otherwise coat the insulator 23 and produce unwanted voltage breakdown or current leakage thereacross. An annular spring 28 is positioned circumscribing the frame member 21 to provide a quick disconnect connection between the power connector, not shown, and the pump 1.

A horseshoe shaped permanent magnet 29 is positioned with respect to the rectangular vacuum envelope 16 such that the magnetic field B of the magnet 29 threads through the individual cellular elements of the anode 17 in substantial parallelism to the longitudinal axis thereof. The strength of the magnetic field B is critically related to the diameter $d$ of the individual cellular anode compartments in accordance with a newly discovered rule which will be more fully described below. Although a D.C. magnetic field is utilized in a preferred embodiment of the present invention, A.C. magnetic or time varying D.C. fields may be utilized. For example, the fringing time varying magnetic field of a circular particle accelerating machine such as the Bevatron may be used.

In operation, a positive potential of 0.5 kv. or more is applied to the anode 17 via conductive rod 18. The vacuum envelope 16 and therefore the cathode plates 24 are preferably operate at ground potential to reduce hazard to operating personnel. With these potentials applied a region of intense electric field is produced between the cellular anode 17 and the cathode plates 24. This electric field produces a breakdown of gas within the pump resulting in a glow discharge within the cellular anode 17 and between the anode 17 and the cathode plates 24. The glow discharge results in positive ions being driven into the cathode plates 17 to produce dislodgment of reactive cathode material which is thereby sputtered onto the nearby anode 17 to produce gettering of molecules in the gaseous state coming in contact therewith. In this manner the pressure within the vacuum envelope 16 and therefore structures communicating therewith are evacuated.

Referring now to FIG. 4 it has been discovered that the pumping speed per anode cell $S_o$ of the electrical vacuum pump 1 varies with the characteristic transverse dimension or diameter $d$ of the individual cells as a function of magnetic field B as shown in FIG. 4. More specifically, it has been discovered that there is a critical anode cell diameter $d_c$ for a given magnetic field intensity B below which the glow discharge ceases and the pumping speed per unit cell drops to substantially zero liters per second. It has also been discovered that the pumping speed per anode cell $S_o$ increases with diameter $d$ of the individual cell at an initially substantially linear rate after which the pumping speed begins to saturate with increasing diameter of the cell to a point at which increasing the diameter of the cell does not increase the speed thereof. In fact, experimental evidence indicates that after the pumping speed of a cell saturates that the speed $S_o$ actually begins to decrease with increasing cell diameter $d$. The pumping speed per unit cell $S_o$, for values of $d$ greater than $d_c$, in the linear portion of the pumping speed curve, can be approximated by the following expression:

$$S_o = K''(d - d_c) \qquad (1)$$

where $K''$ is a function of voltage V, magnetic field intensity B, cell geometry, cathode material and the gas being pumped. It has also been discovered that the critical minimum diameter $d_c$ for the individual cellular anode compartments decreases with increasing magnetic field intensity B according to the following rule:

$$d_c = \frac{K}{B} \qquad (2)$$

where K is, to first order, a constant when cell diameter is less than cell length. K has dimensions of inch gauss and lies within the range of between 150 and 300. A "best fit" value of 220 has been observed for K.

The pumping speed per unit of cathode area $S_A$ is related to the number of cells per unit area $N_A$ and the pumping speed per unit cell $S_o$ by the following expression:

$$S_A = N_A S_o \qquad (3)$$

The number of cells per unit of cathode area $N_A$ is related to the diameter $d$ of the cells by the following relationship:

$$N_A = \frac{K'}{d^2} \qquad (4)$$

where $K'$ is a constant of proportionality, termed the packing factor, and is dependent upon the cell geometries. For cells of square cross section, as shown in FIG. 6A, $K' = 1$. For cells of circular cross section packed as shown in FIG. 6B, $K' = 1$ also. For cells of circular cross section closely packed as shown in FIG. 6C, $$K' = \frac{2}{\sqrt{3}}$$

For cells of hexagonal cross section as shown in FIG. 6D, $$K' = \frac{2}{\sqrt{3}}$$

Substituting Equations 4 and 1 for $N_A$ and $S_o$ respectively into Equation 3 above we obtain the following expression for $S_A$:

$$S_A = \frac{K'}{d^2} K''(d - d_c) \qquad (5)$$

Rearranging Equation 5 and taking the first derivative of $S_A$ with respect to $d$ we obtain:

$$\frac{\partial S_A}{\partial d} = K'K''\left(-\frac{1}{d^2} - \frac{2d_c}{d^3}\right) = -\frac{K'K''}{d^2}\left(1 - 2\frac{d_c}{d}\right) \qquad (6)$$

Setting Equation 6 equal to zero and solving for $d$ we find that the optimum cell diameter $d_o$ for maximum pumping speed is:

$$d_o = 2d_c \quad (7)$$

Equation 7 is an important expression as it shows that the pumping speed per unit area of cathode $S_A$ has an optimum value corresponding to an optimum cell diameter $d_o$. Moreover, $d_o$ is independent of the packing factor, voltage V, cell geometry, cathode material, and the gas being pumped.

From an examination of the curves drawn in FIG. 4 it can be seen that $S_o$ saturates at a point in the vicinity of $2d_c$ at which point it approaches a constant value or may even decrease thereafter with increasing $d$. Therefore, useful approximations to the curves of FIG. 4 for $S_o$ are:

$$S_o = 0 \text{ for } d < d_c \quad (8)$$

$$S_o = K''(d - d_c) \text{ for } d_c \leq d \leq 2d_c \quad (9)$$

$$S_o = K''d_c \text{ for } d > 2d_c \quad (10)$$

Substituting Equations 8, 9 and 10 back into Equation 3, solving for $S_A$ in the three regions of $d$ and plotting normalized $S_A$ as a function of normalized cell diameter $$\frac{d}{d_c}$$

we obtain the curve as shown in FIG. 7. The criticality of the cell diameters corresponding to $d_c$ and $d_o$ can be clearly seen in FIG. 7.

A design procedure for obtaining optimum pumping speed per unit of cathode area follows from the teachings of the above specification. The pumping speed per unit of cathode area increases with increasing magnetic field intensity B assuming the cells can be aligned with the field B. However, strong magnetic fields are usually costly to produce such that economics will normally dictate a certain maximum magnetic field intensity. Pumping speed varies approximately linearly with applied voltage from a minimum voltage of approximately 0.5 kv. to 10 kv. and higher, depending on magnetic field. Economics will again dictate the highest desired voltage V. A desired anode cell geometry is selected bearing in mind that the pumping speed is directly proportional to the length $l$ of the individual cellular compartments. However, in many applications long magnetic gaps are expensive to produce and thus a cell length $l$ must be selected commensurate with the available magnetic field B. The critical cell diameter $d_c$ may be estimated from Equation 2 or measured empirically by reducing the magnetic field intensity B or cell diameter $d$ until cutoff is reached. The cells may then be made to have a diameter $d$ approximately equal to $2d_c$ thereby optimizing the pumping speed per unit of cathode area.

The magnetic field intensity for a particular magnet may not be uniform transversely of the gap and therefore cells of differing optimum diameter $d_o$ should be positioned in variable accordance with the magnetic field intensity B. In addition, the longitudinal axis of the anode cellular compartments should be in substantial alignment with the magnetic field lines. If the magnetic field is "barreled," optimum anode cell diameter $d_o$ will be slightly larger than $2d_c$. Moreover, care must be taken to assure that the conductance to gas flow within the structure is adequate such that utilization may be made of the optimum pumping speed. For example, it is possible that a cellular anode constructed for pumping 100 liters per second could be interconnected to a device it is desired to evacuate via a tubulation whose conductance is 200 liters per second; in this case the maximum pumping speed that could be realized would be 67 liters per second. Thus, care must be taken to assure adequate gas access to the cellular compartments for realization of the optimum pumping speed.

In a typical example of a pump 1, a magnetic field intensity B of 1000 gauss, anode cell diameters $d$ of 0.5", applied voltage of 4 kv., anode to cathode spacing S of 0.25", cell length $l$ of 0.9", and titanium cathode plates 24 yields a pumping speed of 0.8 liter per anode cell.

From an inspection of the graph of FIG. 7 it can be seen that the half speed width of the pumping speed vs. cell diameter curve occurs for values of $$\frac{d}{d_c}$$

lying within the range of 1.2 to 2.8. Furthermore, it can be seen that an unexpected substantial enhancement in the pumping speed per unit area can be had if $$\frac{d}{d_c}$$

lies within a range of 1.2 to 4.0.

The teachings of the present invention also have applicability to vacuum gages. More specifically, it has been discovered that the principles set forth above with regard to critical proportions of anode dimensions for vacuum pumps are equally applicable to anode proportions of electrical vacuum gages of the type as taught by U.S. Patent No. 2,197,079 to F. M. Penning. It has been discovered that the same mechanism regarding the formation of ion current is present in both the electrical vacuum gage and the electrical vacuum pump 1. The electrical vacuum pump 1 utilizes ion current to produce sputtering of reactive cathode material which is then condensed upon the surfaces for gettering gas coming in contact therewith to evacuate the apparatus. Maximum sputtering occurs and therefore maximum pumping occurs when maximum ionization current is obtained. Therefore, a vacuum gage may be built having enhanced ion current and therefore enhance sensitivity by employing a cellular anode 17 having critically proportioned cellular compartments therein according to the teachings of the present invention. However, in the vacuum gage application the cathode plates 24 are not made of a reactive material but instead are made of a material which is either very difficult to sputter or which, if sputtered, will not serve to entrap or getter gas coming in contact therewith if it is desired to minimize pumping action of the gage. A suitable gage cathode material which is very difficult to sputter is aluminum.

Table I below gives: $d_c$, $d_o$ in inches and ranges of $d$ for $$\frac{d}{d_c}$$

between 1.2 to 2.8 and 1.2 to 4.0 respectively for certain values of B between 400 and 10,000 gauss.

*Table I*

| B | $d_c$* | $d_o$ | $d/d_c$ 1.2-2.8 | $d/d_c$ 1.2-4.0 |
| --- | --- | --- | --- | --- |
| 400 | 0.6 | 1.1 | 0.72-1.68 | 0.72-2.4 |
| 500 | 0.4 | 0.9 | 0.48-1.12 | 0.48-1.8 |
| 600 | 0.4 | 0.7 | 0.48-1.12 | 0.48-1.4 |
| 700 | 0.3 | 0.6 | 0.36-0.84 | 0.36-1.2 |
| 800 | 0.28 | 0.56 | 0.336-0.784 | 0.336-1.12 |
| 900 | 0.24 | 0.5 | 0.288-0.672 | 0.288-0.96 |
| 1,000 | 0.22 | 0.4 | 0.264-0.616 | 0.264-0.88 |
| 1,200 | 0.2 | 0.4 | 0.24-0.56 | 0.24-0.8 |
| 1,500 | 0.15 | 0.3 | 0.180-0.42 | 0.18-0.6 |
| 1,800 | 0.13 | 0.26 | 0.156-0.364 | 0.156-0.52 |
| 2,000 | 0.11 | 0.22 | 0.132-0.308 | 0.132-0.44 |
| 2,500 | 0.09 | 0.18 | 0.108-0.252 | 0.108-0.36 |
| 3,000 | 0.07 | 0.15 | 0.084-0.196 | 0.084-0.28 |
| 4,000 | 0.06 | 0.11 | 0.072-0.168 | 0.072-0.24 |
| 5,000 | 0.04 | 0.09 | 0.048-0.112 | 0.048-0.18 |
| 6,000 | 0.04 | 0.07 | 0.048-0.112 | 0.048-0.14 |
| 7,000 | 0.03 | 0.06 | 0.036-0.084 | 0.036-0.12 |
| 8,000 | 0.03 | 0.06 | 0.0336-0.0784 | 0.0336-0.112 |
| 9,000 | 0.02 | 0.05 | 0.0288-0.0672 | 0.0288-0.096 |
| 10,000 | 0.02 | 0.04 | 0.0264-0.0616 | 0.0264-0.088 |

* K=220.

What is claimed is:
1. A glow discharge apparatus including, an anode member subdivided into a plurality of lesser hollow open ended compartments formed by holes extending through said anode member, a cathode member disposed opposite the open ends of said anode compartments and being slightly spaced apart therefrom and defining a path for glow discharge ion current between said anode and cathode members, means for applying a positive potential to said anode member with respect to said cathode member, means for producing and directing a magnetic field substantially coaxially of the holes forming said lesser anode compartments for enhancing the glow discharge ion current, and said lesser anode compartments having a diameter $d$ in inches falling within the range of 1.2 to 2.8 times a certain critical diameter $d_c$, where $d_c$ is equal to

$$\frac{K}{B}$$

where K is a constant within the range of 150 to 300 inch gauss, and B is the coaxial magnetic field intensity in gauss, whereby the ion current of the glow discharge is greatly enhanced.

2. The apparatus according to claim 1 wherein K is equal to 220 inch gauss.

3. A glow discharge apparatus including, an anode member subdivided into a plurality of lesser hollow open ended compartments formed by holes extending through said anode member, a cathode member disposed opposite the open ends of said anode compartments and being spaced apart therefrom and defining a path for glow discharge ion current between said anode and cathode members, means for applying a positive potential to said anode member with respect to said cathode member, means for producing and directing a magnetic field coaxially of said lesser anode compartments for enhancing the glow discharge ion current, and said lesser anode compartments having a diameter $d$ in inches substantially equal to twice a certain critical diameter $d_c$ where $d_c$ is equal to $$\frac{K}{B}$$

and where K is a constant lying within a range of 150 to 300 inch gauss and B is the coaxial magnetic field intensity in gauss.

4. The apparatus according to claim 3 wherein K is equal to 220.

5. The apparatus according to claim 2 wherein said coaxial magnetic field is a D.C. field and has a magnitude equal to or greater than 1500 gauss.

6. The apparatus according to claim 5 wherein the length of said lesser hollow open ended anode compartment are substantially equal to or greater than the diameter thereof.

7. A glow discharge apparatus including, an anode member subdivided into a plurality of lesser hollow open ended anode compartments formed by holes extending through said anode member, said lesser hollow compartments being closely grouped in a plane substantially at right angles to the longitudinal axes of said compartments, a cathode member disposed opposite the open ends of said anode compartments and being spaced apart therefrom and defining a path for glow discharge ion current between said anode and cathode members, means for applying a positive potential to said anode member with respect to said cathode member, means for producing and directing a D.C. magnetic field coaxially of said lesser anode compartments for enhancing the glow discharge ion current, and said lesser anode compartments having a diameter $d$ in inches falling within the range of 1.2 to 2.8 times a certain critical diameter $d_c$ where $d_c$ is equal to $$\frac{220 \text{ inch gauss}}{B}$$

where B is the coaxial magnetic field intensity in gauss.

8. The apparatus according to claim 7 wherein said lesser hollow open ended anode compartments have a length substantially equal to or greater than their diameter, and wherein said magnetic field intensity is in excess of 400 gauss.

9. The apparatus according to claim 8 wherein said magnetic field is also in excess of 500 gauss.

10. The apparatus according to claim 8 wherein said magnetic field is also in excess of 600 gauss.

11. The apparatus according to claim 8 wherein said magnetic field is also in excess of 700 gauss.

12. The apparatus according to claim 8 wherein said magnetic field is also in excess of 800 gauss.

13. The apparatus according to claim 8 wherein said magnetic field is also in excess of 900 gauss.

14. The apparatus according to claim 8 wherein said magnetic field is also in excess of 1,000 gauss.

15. The apparatus according to claim 8 wherein said magnetic field is in excess of 1,200 gauss.

16. The apparatus according to claim 8 wherein said magnetic field is also in excess of 1,500 gauss.

17. The apparatus according to claim 8 wherein said magnetic field is also in excess of 2,000 gauss.

18. The apparatus according to claim 7 wherein the glow discharge apparatus comprises an electrical vacuum pump, and said cathode member is made of a reactive material which is sputtered by the glow discharg ion current and collected by said subdivided anode member for gettering gas coming in contact therewith.

19. An electrical high vacuum pump apparatus including, an anode member subdivided into a plurality of lesser hollow open ended cellular compartments, said cellular compartments being closely grouped in a plane substantially at right angles to the longitudinal axis of said compartments, a reactive cathode member disposed opposite the open ends of said cellular compartments and being slightly spaced apart therefrom and defining a path for glow discharge ion current between said anode and cathode members, means for applying a positive potential to said anode member with respect to said cathode member, means for producing and directing a magnetic field of approximately 800 gauss coaxially of said lesser cellular compartments for enhancing the glow discharge ion current, and said lesser cellular compartments having a diameter of approximately 0.56 inch whereby the pumping speed of the electrical vacuum pump is greatly enhanced.

20. A vacuum pump apparatus including, an anode member subdivided into a plurality of lesser hollow open ended anode compartments formed by holes extending through said anode member, a cathode member disposed opposite the open ends of said anode compartments and being spaced apart therefrom and defining a path for glow discharge ion current between said anode and said cathode members, means for applying a positive potential to said anode member with respect to said cathode member, means for producing and directing a D.C. magnetic field coaxially of said lesser anode compartments for enhancing the glow discharge ion current said lesser hollow compartments being grouped in a plane transversely of the direction of said magnetic field threading through said compartments and said lesser anode compartments having a diameter in inches falling within the range of 1.2 to 4.0 times a certain critical diameter $d_c$ where $d_c$ is equal to $$\frac{300 \text{ inch gauss}}{B}$$

where B is the coaxial magnetic field intensity in gauss.

21. The apparatus according to claim 20 wherein said magnetic field intensity is in excess of 400 gauss.

22. The apparatus according to claim 20 wherein said magnetic field intensity is in excess of 500 gauss.

23. The apparatus according to claim 20 wherein said magnetic field intensity is in excess of 600 gauss.

24. The apparatus according to claim 20 wherein said magnetic field intensity is in excess of 700 gauss.

25. The apparatus according to claim 20 wherein said magnetic field intensity is in excess of 800 gauss.

26. The apparatus according to claim 20 wherein said magnetic field intensity is in excess of 900 gauss.

27. The apparatus according to claim 20 wherein the magnetic field intensity is in excess of 1,000 gauss.

28. The appartaus according to claim 20 wherein said magnetic field intensity is in excess of 1,200 gauss.

29. The apparatus according to claim 20 wherein said magnetic field intensity is in excess of 1,500 gauss.

30. The apparatus according to claim 20 wherein the magnetic field intensity is in excess of 2,000 gauss.

No references cited.